United States Patent [19]
Belikov

[11] Patent Number: 5,548,167
[45] Date of Patent: Aug. 20, 1996

[54] INDUCTIVE LINEAR ELECTRIC MOTOR

[75] Inventor: Victor Belikov, Odessa, Ukraine

[73] Assignee: Key Life Technologies Corp., South Orange, N.J.

[21] Appl. No.: 243,240

[22] Filed: May 16, 1994

[51] Int. Cl.⁶ .................................................. H02K 41/02
[52] U.S. Cl. ................................................................ 310/12
[58] Field of Search .................................. 310/12, 13, 14; 318/135

[56] References Cited

U.S. PATENT DOCUMENTS 5,032,746  7/1991  Ueda et al. ............................... 310/12

FOREIGN PATENT DOCUMENTS 2510839  2/1983  France .
1494162  7/1989  U.S.S.R. .
2098405A  11/1992  United Kingdom .

*Primary Examiner*—Steven L. Stephan
*Assistant Examiner*—Judson H. Jones
*Attorney, Agent, or Firm*—Cobrin Gittes & Samuel

[57] ABSTRACT

An inductive linear electric dc motor including a stator and a slidable or rollable rotor. The stator has a ferromagnetic strip with spaced poles dispersed along the strip in a checkerboard pattern. The rotor has a ferromagnetic housing made up of an upper yoke and side yokes, concentrators disposed within the ferromagnetic housing such that of each of the concentrators has a segment which segments together form an armature, and different arrangements of permanent magnets that optimize the uniformity of the magnetic field through an armature winding wound about the armature.

11 Claims, 3 Drawing Sheets

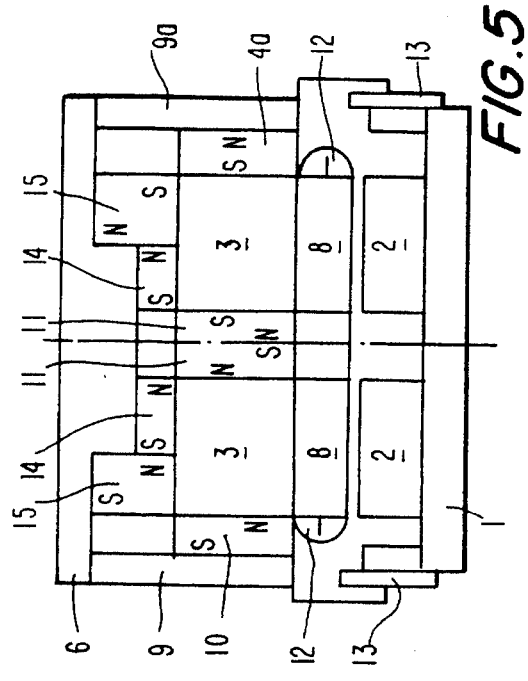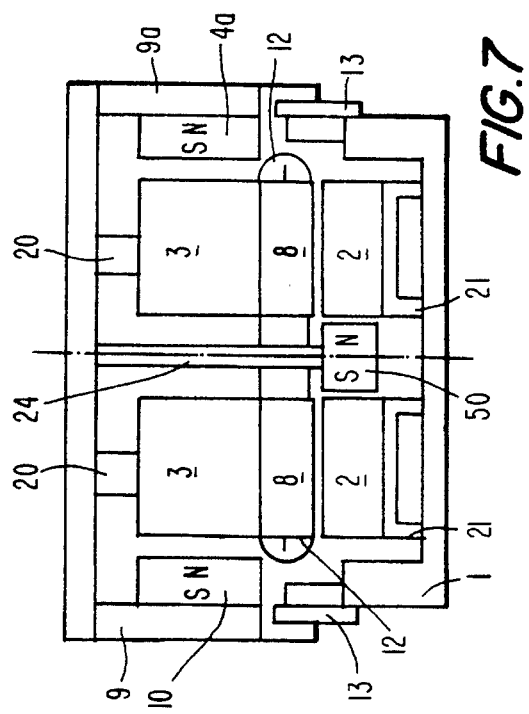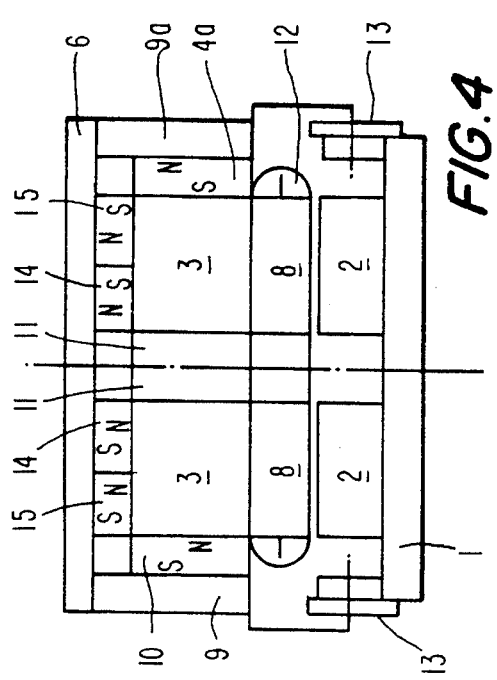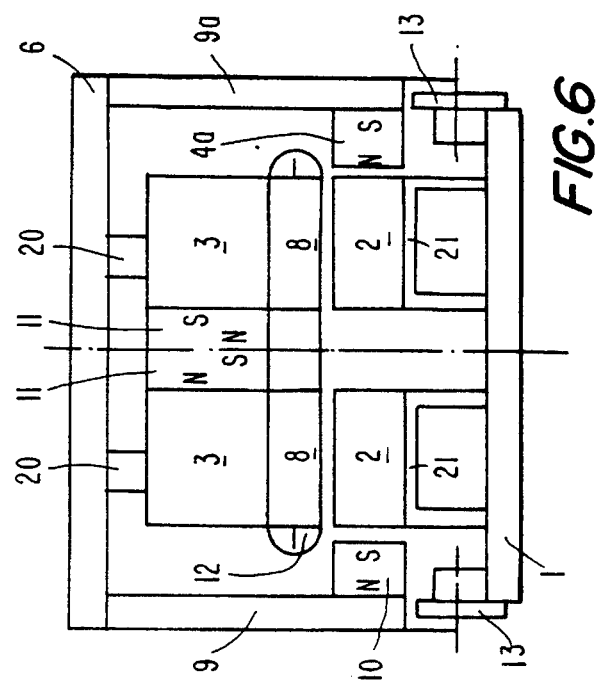

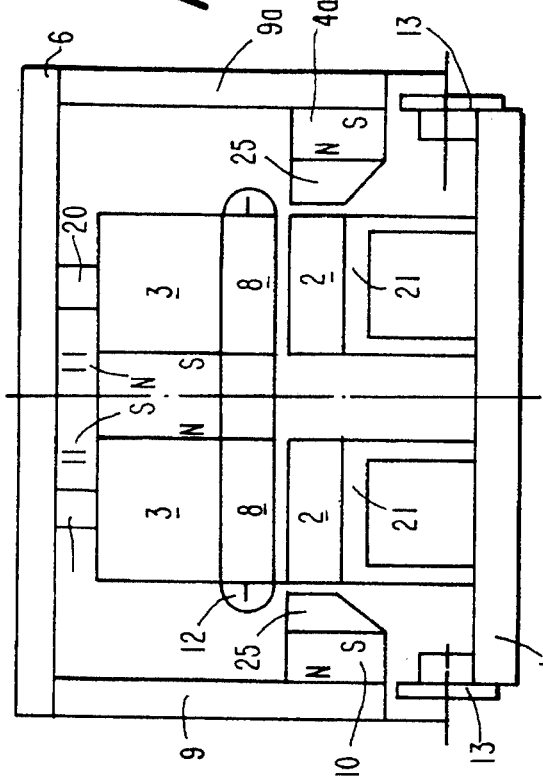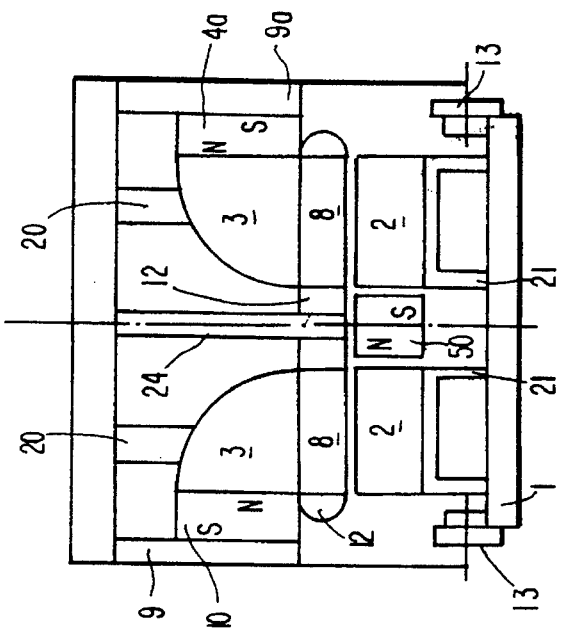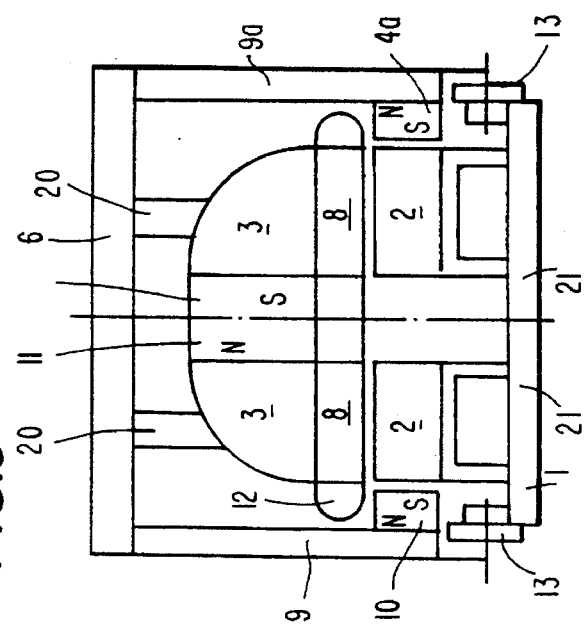

INDUCTIVE LINEAR ELECTRIC MOTOR

BACKGROUND OF THE INVENTION

This invention relates generally to motors and more particularly to an inductive linear dc (direct current) electric motor.

In linear dc motors, voltages are generated in windings or groups of coils by sending current through the windings and placing the windings in a magnetic field. The more uniform the magnetic field the more efficient and the more accurate the motor can be.

A group of coils interconnected so that their generated voltages all make a positive contribution to the desired result is called an armature winding. The armature winding of a dc motor is the rotating or moving member, or rotor. In general these coils are wound on iron cores. This is done to maximize the coupling between coils, to increase the magnetic energy density associated with the electromechanical interaction, and to shape and distribute the magnetic fields according to the requirements of each particular motor design.

Analysis of dc motors shows that associated with both the rotor and stator are magnetic flux distributions which are fixed in space. It also shows that the force-producing characteristics of the dc motor stems from the tendency of these flux distributions to align. An induction motor, despite fundamental differences, works on exactly the same principle; one can identify flux distributions associated with the rotor and stator, which move in synchronism and which are separated by some force-producing displacement.

DC motors are generally much more adaptable to adjustable-speed service than the ac motors associated with a constant-speed rotating field. The susceptibility of dc motors to adjustment of their operating speed over wide ranges by a variety of methods is one of the important reasons for the strong competitive position of dc machinery in modern industrial and commercial application.

An example of a linear dc electric motor can be found in French Patent No. 2510839 to Belikov et al. The problem with this motor, is that there is too much power wasted due to the lack of uniformity of the magnetic field.

Another example of dc motors can be found in USSR Patent No. 1494162 to Belikov et al. This inductive linear dc motor includes a rotor having two concentrators, framed by permanent magnets. The problem with this motor is reduction of the value of magnetic induction of the main fields in the areas of air clearance remote from the longitudinal axis of the moveable element (the rotor).

Thus there exists the need for an efficient induction linear electric dc motor in which the magnetic field is more uniformly distributed through the armature winding.

It is accordingly an object of the invention to provide an induction linear electric direct current motor.

It is another object of the invention to provide an induction linear electric direct current motor that provides more uniformly distributed magnetic fields to the armature winding.

It is a further object of the invention to provide a more efficient induction linear electric direct current motor.

It is yet another object of the invention to provide a more accurate induction linear electric dc motor.

SUMMARY OF THE INVENTION

The foregoing objects are attained by the present invention, which provides an inductive linear electric dc motor.

The invention utilizes a stationary part or stator which includes a ferromagnetic member, and projecting from the ferromagnetic member, spaced poles dispersed in a checkerboard pattern. The invention also utilizes a moving, sliding or rolling portion or rotor (terms used interchangeably) which is in magnetomotive communication with the stator. The rotor includes a ferromagnetic housing incorporating a plurality of yokes. It includes a number of concentrators disposed within the ferromagnetic housing and each having a segment such that together the segments make up an armature. There is a first magnet connected between a first of the concentrators and a first yoke, a second magnet connected between the first of the concentrators and the first yoke, and other magnets. Further, the rotor includes an armature winding disposed about the armature such that the armature winding is in flux communication with the stator. The rotor and the stator are connected by support members which are slidably or rollably connected between the rotor and the stator.

In a second embodiment, the stator includes a first member which may or may not be ferromagnetic, a number of spaced base members coupled to and dispersed on the first member in a checkerboard pattern and a number of poles each connected to one of the spaced base members. The rotor includes a ferromagnetic housing incorporating a plurality of yokes, a number of concentrators each having a segment such that together the segments make up an armature. Each of the concentrators is disposed within the ferromagnetic housing and each is secured to the upper yoke by a non-magnetic member. There is also a first magnet connected to a first of the yokes proximal to the poles, a second magnet connected to a second of the yokes proximal to the poles, and at least one other magnet. Further, the rotor includes an armature winding disposed about the armature such that the armature winding is in flux communication with the stator. The rotor and the stator are connected by support members which are slidably or rollably connected between the rotor and the stator.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and accompanying drawings, in which:

FIG. 4 depicts a cross sectional front view of a first embodiment of the invention including details of the first arrangement of the permanent magnets;

FIG. 5 depicts a cross sectional front view of a second embodiment of the invention including details of plurality of yokes and the second arrangement of the permanent magnets;

FIG. 6 depicts a cross sectional side view of a third embodiment of the invention including details of the plurality of yokes, the base members, the non-magnetic members, and a third permanent magnet arrangement;

FIG. 7 depicts a cross sectional front view of fourth embodiment of the invention including details of the base members, the non-magnetic members, the rod member and the permanent magnet arrangement;

FIG. 8 depicts a cross sectional front view of fifth embodiment of the invention including details of the base members, the non-magnetic members, the field shaping members and the permanent magnet arrangement;

FIG. 9 depicts a cross sectional front view of sixth embodiment of the invention including details of the base members, the non-magnetic members, the plurality of yokes, the concentrators and the permanent magnet arrangement;

FIG. 10 depicts a cross sectional front view of seventh embodiment of the invention including details of the base members, the non-magnetic members, the rod member, the concentrators and the permanent magnet arrangement.

DESCRIPTION OF ILLUSTRATED EMBODIMENTS

Figure 1:
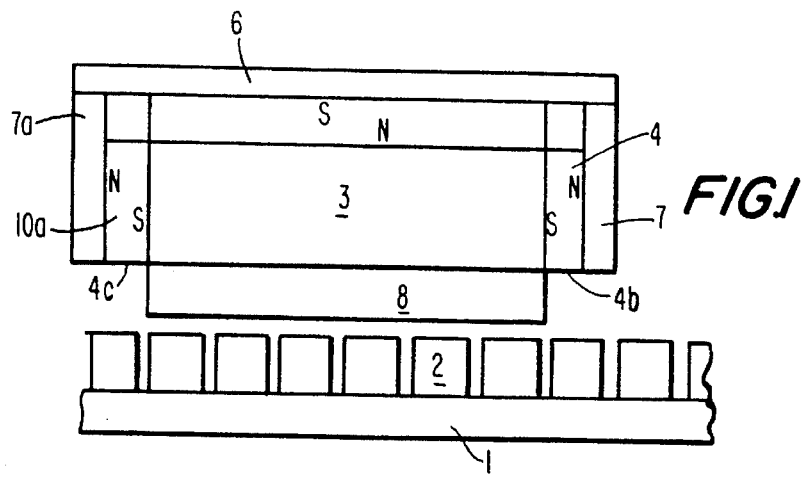
FIG. 1 depicts a cross sectional side view of a linear dc inductive motor known in the art including details of the plurality of yokes, and a portion of the field strip.
Figure 2:
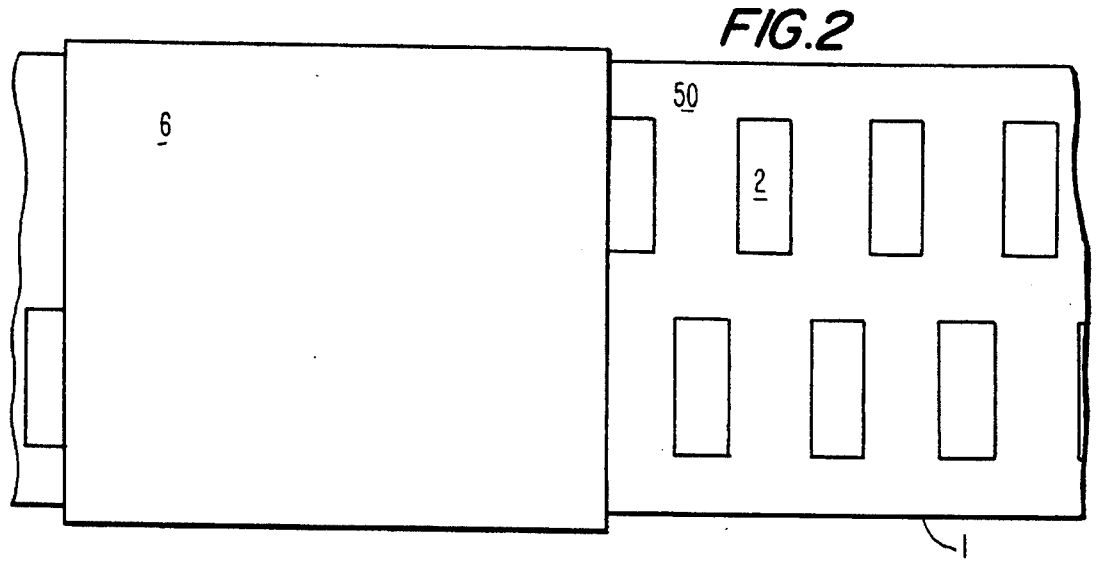
FIG. 2 depicts a top view of the motor depicted in FIG. 1 including details of the checkerboard layout of the poles and recesses.
Figure 3:
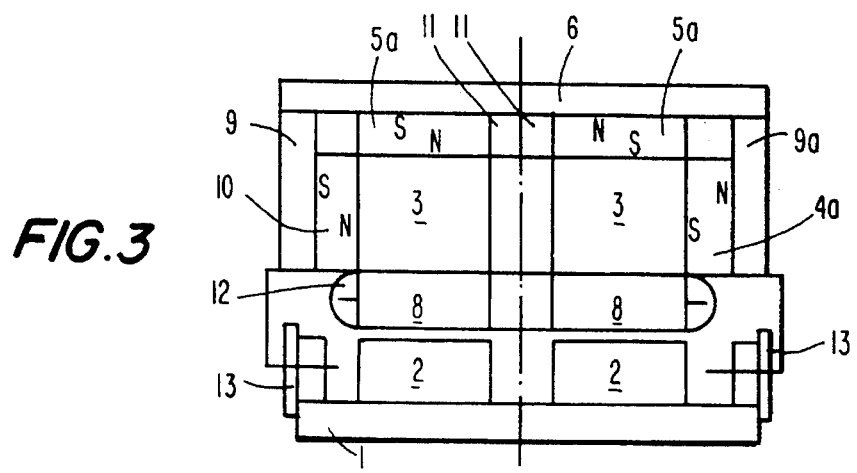
FIG. 3 depicts a cross sectional front view of the motor depicted in FIG. 1 including details of the plurality of yokes, the concentrators, the armature winding, the arrangement of permanent magnets, the field strip and the poles.

FIGS. 1–3 depict various linear dc motors that have been used in the past, including a stator or stationary portion and a rotor or movable portion. The stator includes a field strip 1 which is the same as and will be used interchangeably with ferromagnetic member 1 which has a top face 50, spaced poles 2 which form a checkerboard like pattern on the field strip 1 when viewed with the recesses formed by the spaces left between the spaced poles (seen best in FIG. 2). The rotor includes a ferromagnetic housing incorporating a plurality of yokes including an upper yoke 6, a first-side yoke 9, a second-side yoke 9a, a front-side yoke 7, and a rear side yoke 7a. The first-side yoke 9 and the second side yoke 9a are connected to opposite sides of the upper yoke 6 and the front-side yoke 7 and rear-side yoke 7a are connected to opposite sides of the upper yoke thus forming a box-like structure. The rotor further includes two concentrators 3 disposed within the ferromagnetic housing, a first magnet 10 connected to and between both a first of the concentrators 3 and the first-side yoke 9, a second magnet 4 connected to and between both the first of the concentrators 3 and the front-side yoke 7, a third magnet 10a connected to and between both the first of the concentrators 3 and the rear-side yoke 7a, a fourth magnet 4a connected to and between both a second of the concentrators 3 and the second side-yoke 9a, a fifth magnet 4b (symmetric with the second magnet across a center line running through the front of the motor) connected to and between the second of the concentrators and the front-side yoke 7, a sixth magnet 4c (also symmetric across the same center line) connected to and between the second of the concentrators 3 and the rear-side yoke 7a, a pair of magnets 11 connected back to back such that their poles match south to south, north to north connected to and between and separating the two concentrators, one magnet 5 connected to and between the first of the concentrators 3 and the upper yoke 6 and one magnet 5a connected to and between the second of the concentrators 3 and the upper yoke 6. Also depicted in FIGS. 1–3 is the segments 8 of the concentrators 3 which together make up the armature 8 which is used to house the armature winding 12 which is wound around the armature 8 (the terms segments and armature will be used interchangeably). Lastly, FIGS. 1–3 depict the support members 13 which are connected to the rotor at the side yokes 9 and 9a and are slidably or rollably connectable to the stator and the different polarizations of the permanent magnets as they are mounted.

FIG. 4 depicts a first embodiment of the invention wherein each of the magnets 5 and 5a of the motor depicted in FIGS. 1–3 have been replace by a plurality of magnets of varying strength. It has been depicted as two magnets, a first magnet 15 and a second magnet 14, for ease, but it will be obvious to one skilled in the art that it may be possible to use more than two magnets. As it is depicted in FIG. 4, the first magnet 15 is located closer to the first-side yoke 9 than the second magnet 14. The first magnet 15 is a more powerful magnet than the second 14. The first magnet 15 and the second magnet 14 have the same cross sectional area, but they are made of different materials. For instance the first magnet 15 may be a ferrite-barium compound and the second magnet 14 may be a samarium-cobalt compound. As will be obvious to one skilled in the art, other magnetic materials could be used so long as the first magnet 15 is more powerful than the second magnet 14. The polarities of the different magnets is shown in the figure. Further, it will be obvious to one skilled in the art that the magnets 11 could be replaced by a second plurality of magnets such that the second plurality of magnets includes more than two magnets as was done to magnets 5 and 5a. An advantage this gives the invention over the previous dc motors of this type is it provides a more uniformly distributed magnetic field for the armature winding.

FIG. 5 depicts another embodiment of the invention. This embodiment is similar to the previous embodiment, but rather than having the first magnet 15 made of a different material than the second magnet 14 the magnets are made of the same material, but the cross sectional area of the first magnet 15 is greater than that of the second magnet 14. Further because of this difference in size, the upper yoke must be reshaped so that it is flush with both the first magnet 15 and the second magnet 14 as depicted in FIG. 5. The polarities of the magnets is shown in the figure. This embodiment has the same advantages as the previous embodiment.

FIG. 6 depicts another embodiment of the invention. In this embodiment, all of the magnets have been removed from the previous embodiment with the exception of the second plurality of magnets 11, the magnets 5 and 5a have been removed and replaced by a non-magnetic member 20 that is used to attach the concentrators 3 to the upper yoke, the side yokes 9 and 9a have been lengthened such that they extend beyond the armature 8, and base members 21 have been added to the stator to increase the height of the poles. In this embodiment, the field strip 1 will be referred to as a first member 1 and does not have to be made of a ferromagnetic material. The base members 21 do not need to be made of a ferromagnetic material either. There is a first and second magnet 10 and 4a respectively connected to the bottom portion of the first-side yoke and second-side yoke respectively located at the same level as the poles which is below the armature winding. The polarities of the magnets is shown in the figure. This arrangement also has the advantage of providing a more uniformly distributed magnetic field along the armature winding.

FIG. 7 depicts another embodiment of the invention in which the first embodiment has been modified. In this embodiment the magnets have been removed, the first and second magnets have been removed and replaced by a non-magnetic member 20 that is used to attach the concentrators 3 to the upper yoke, the second plurality of magnets have been removed and replaced by at least one rigid rod member 24 that extends between the concentrators and connects to a third magnet 50 that is located at the same level as the poles which is below the armature winding. There is at least one other magnet 10 connected to a lower portion of the first-side yoke 9 and another at least one other magnet 4a connected to the second-side yoke 9a. Both the at least one other magnets 10 and 4a respectively are connected in such a way as to leave a gap of air between the magnet and the concentrators 3. Like the previous embodiment, this embodiment also includes the base members 21 to increase the height of the poles and the field strip 1 will be referred to as a first member 1 because it does not have to be made of a ferromagnetic material, nor do the base members 21. The polarities of the magnets is shown in the figure.

FIG. 8 depicts still another embodiment of the invention. This embodiment is the same as the embodiment of FIG. 6 with the exception that in this embodiment, field shaping members 25 have been connected to the first and second magnets 10 and 4a. The shape of field shaping members 25 is that of a rectangle with a lower corner cut off. This has the effect of providing more uniformly distributed magnetic field along the armature winding. It will be obvious to one skilled in the art that this cut could also be rounded. The polarities of the magnets is shown in the figure.

FIG. 9 is a preferred embodiment of the invention. This embodiment is the same as the embodiment depicted in FIG. 6 with the exception that the concentrators 3 are shaped such that they have an arcuate shaped portion between the top and the bottom such that the arcuate shaped portion faces the upper yoke and either the first or the second side yoke and the non-magnetic members 20 are connected to the concentrators 3 at the arcuate shaped portion. The polarities of the magnets is shown in the figure.

FIG. 10 is another preferred embodiment of the invention. This embodiment is the same as the embodiment illustrated in FIG. 7 with two exceptions. First, the concentrators 3 are shaped such that they have an arcuate shaped portion between the top and the bottom such that the arcuate shaped portion faces the upper yoke 6 and the other concentrator 3 and the non-magnetic members 20 is connected to the arcuate shaped portion. Second, there is no air gap between the first and second magnets respectively and the concentrators 3. Each of the first and second magnets 10 and 4a is connected to the concentrators 3. The polarities of the magnets is shown in the figure.

In the embodiments depicted in FIGS. 6–10 it should be noted that while magnets 10, 4a and 11 may be magnets of the same strength, or magnets 11 may be stronger than magnets 10 and 4a, to provide the maximum force magnets 10 and 4a should be stronger than magnets 11. Similarly, magnet 50 should be stronger than magnets 10 and 4 a to provide maximum force.

In accordance with known principles of operation employed in linear inductive dc motors, the control impulse is given to the armature winding 12. Due to Biot-Savart-Laplace's Law between the electric current of the armature winding and the magnetic field created by the permanent magnets an attractive electromagnetic force is produced which causes the rotor to move on the support members. Mechanical collectors or contactless semiconductive commutators change the current in the armature winding so that the speed and direction of the movement are effected based upon the control system. Direction and speed adjustment are performed as known in the art.

It will thus be seen that the invention efficiently attains the objects set forth above, among those made apparent from the preceding description. In particular, the invention provides an inductive linear electric dc motor. Those skilled in the art will appreciate that the configurations depicted in FIGS. 4–11 provide more uniformly distributed magnetic fields along the armature winding, and are thus more accurate and more efficient.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. An inductive linear electric motor comprising:
   a stator comprising:
      a ferromagnetic member; and
      a plurality of spaced poles projecting from said ferromagnetic member in a checkerboard pattern;
   a rotor in magnetomotive communication with said stator, said rotor comprising:
      a ferromagnetic housing comprising a plurality of yokes that encompass said rotor;
      a plurality of concentrators, each of said concentrators being disposed within said ferromagnetic housing, each of said concentrators having a segment, which segments together form an armature;
      a first magnet coupled between a first of said plurality of concentrators and a first of said yokes;
      a second magnet coupled between said first of said plurality of concentrators and said first of said yokes, such that said first and second magnets are adjacent to each other and have substantially different strengths;
      other magnets;
      an armature winding disposed about said armature such that said armature winding is in flux communication with said stator; and
   a plurality of support members slidably coupled between said rotor and said stator.

2. The inductive linear electric motor as claimed in claim 1 wherein said other magnets include a plurality of magnets coupled between said concentrators and said yokes and a plurality of magnets coupled between said concentrators.

3. The inductive linear electric motor as claimed in claim 1 wherein said plurality of concentrators comprises a first and second concentrator; and, said first and second magnets are the same size.

4. The inductive linear electric motor as claimed in claim 1 wherein said plurality of concentrators comprises a first and second concentrator; and, said first magnet is larger in size than said second magnet.

5. An inductive linear electric motor comprising:
   a stator comprising:
      a first member;
      a plurality of spaced base members coupled to and dispersed on said first member in a checkerboard pattern; and
      a plurality of poles coupled to said plurality of spaced base members;
   a rotor in magnetomotive communication with said stator, said rotor comprising:

a ferromagnetic housing comprising a plurality of yokes that frame said ferromagnetic housing;

a plurality of concentrators, each of said concentrators being disposed within said ferromagnetic housing and each being secured to said yoke by a member, each of said concentrators having a segment which segments together from an armature;

a first magnet located on the lower portion of said armature and coupled to said yoke proximal said poles;

a second magnet located on the lower portion of said armature and coupled to said yoke proximal said poles;

at least one other magnet;

an armature winding disposed about said armature such that said armature winding is in flux communication with said stator; and a plurality of support members slidably coupled between said rotor and said stator.

6. The inductive linear electric motor as claimed in claim 5 wherein said at least one other magnet comprises:

a third magnet coupled to a first of said concentrators;

a fourth magnet coupled to a second of said concentrators;

said third and fourth magnets being coupled to each other.

7. The inductive linear electric motor as claimed in claim 6 further including a first field shaping member coupled to said first magnet and a second field shaping member coupled to said second magnet.

8. The inductive linear electric motor as claimed in claim 6 wherein each of said plurality of concentrators has an arcuate shaped portion such that said arcuate shaped portion faces said yokes; and said member is secured to said arcuate shaped portion.

9. An inductive linear electric motor comprising:

a stator comprising:

a first member;

a plurality of spaced base members coupled to and dispersed on said first member in a checkerboard pattern; and a plurality of poles coupled to said plurality of spaced base members;

a rotor in magneto motive communication with said stator, said rotor comprising:

a ferromagnetic housing comprising a plurality of yokes that frame said ferromagnetic housing;

a plurality of concentrators, each of said concentrators being disposed within said ferromagnetic housing and each being secured to said yoke by a member, each of said concentrators having a segment which segments together from an armature;

a first magnet located on the upper portion of said armature and coupled to said yoke proximal said poles;

a second magnet located on the upper portion of said armature and coupled to said yoke proximal said poles;

at least one other magnet;

an armature winding disposed about said armature such that said armature winding is in flux communication with said stator; and a plurality of support members slidably coupled between said rotor and said stator.

10. The inductive linear electric motor as claimed in claim 9 wherein said first and second magnets are not secured to said concentrators; and said at least one other magnet comprises a magnet coupled to said yokes by a rod wherein said rod extends between said concentrators.

11. The inductive linear electric motor as claimed in claim 9 wherein each of said plurality of concentrators has an arcuate shaped portion such that said arcuate shaped portions face each other;

said member is secured to said arcuate shaped portion; and said first and second magnets are coupled to said concentrators.

* * * * *